(12) United States Patent  
Inoue et al.

(10) Patent No.: US 8,053,100 B2  
(45) Date of Patent: Nov. 8, 2011

(54) BATTERY UNIT WITH COOLING DEVICE

(75) Inventors: Yoshimitsu Inoue, Chiryu (JP); Masamichi Makihara, Anjo (JP)

(73) Assignee: Denso Corporation, Kariya (JP)

( * ) Notice: Subject to any disclaimer, the term of this patent is extended or adjusted under 35 U.S.C. 154(b) by 890 days.

(21) Appl. No.: 12/080,130

(22) Filed: Apr. 1, 2008

(65) Prior Publication Data

US 2008/0247135 A1    Oct. 9, 2008

(30) Foreign Application Priority Data

Apr. 3, 2007 (JP) ................................. 2007-097794

(51) Int. Cl.
*H01M 10/50* (2006.01)
*H05K 7/20* (2006.01)

(52) U.S. Cl. ........................................ 429/120; 361/695

(58) Field of Classification Search .................. 429/120; 361/695
See application file for complete search history.

(56) References Cited

U.S. PATENT DOCUMENTS

| | | | |
|---|---|---|---|
| 6,111,387 A | 8/2000 | Kouzu et al. | |
| 6,211,645 B1 | 4/2001 | Kouzu et al. | |
| 6,211,646 B1 | 4/2001 | Kouzu et al. | |
| 6,340,877 B1* | 1/2002 | Mita et al. | 320/112 |
| 6,448,741 B1* | 9/2002 | Inui et al. | 320/107 |
| 2003/0211384 A1* | 11/2003 | Hamada et al. | 429/120 |
| 2005/0285563 A1 | 12/2005 | Yoneda | |
| 2006/0115721 A1* | 6/2006 | Lee et al. | 429/156 |
| 2006/0169507 A1 | 8/2006 | Inoue et al. | |
| 2006/0216582 A1* | 9/2006 | Lee et al. | 429/120 |
| 2007/0026301 A1* | 2/2007 | Lee et al. | 429/120 |
| 2007/0196728 A1 | 8/2007 | Yang | |

FOREIGN PATENT DOCUMENTS

| | | |
|---|---|---|
| EP | 1 701 041 | 9/2006 |
| JP | 7-30450 | 6/1995 |
| JP | 10-270095 | 10/1998 |
| JP | 2000-228228 | 8/2000 |
| JP | 2003-346759 | 12/2003 |
| JP | 2004-311157 | 11/2004 |
| JP | 2006-012471 | 1/2006 |
| JP | 2006-024510 | 1/2006 |

(Continued)

OTHER PUBLICATIONS

Office action dated Feb. 16, 2010 in corresponding Japanese Application No. 2007-097794.

(Continued)

*Primary Examiner* — Jonathan Crepeau
*Assistant Examiner* — Muhammad Siddiquee
(74) *Attorney, Agent, or Firm* — Harness, Dickey & Pierce, PLC (57) ABSTRACT

A battery unit includes a module assembly, a housing that houses the module assembly, and a blower. The module assembly includes a stack of battery modules, and defines a first surface and a second surface opposite to the first surface. The blower is disposed at an end of the module assembly. A rotation shaft of the blower is located between a first plane that includes the first surface and a second plane that includes the second surface. The blower is configured to supply air toward the first surface of the module assembly in a direction perpendicular to a stacking direction of the battery modules. The air is supplied over a range that is substantially equal to a dimension of the module assembly in the stacking direction.

10 Claims, 7 Drawing Sheets

FOREIGN PATENT DOCUMENTS

| | | |
|---|---|---|
| JP | 2006-216303 | 8/2006 |
| JP | 2006-242554 | 9/2006 |
| JP | 2006-318820 | 11/2006 |
| WO | WO 2007-027020 | 3/2007 |

OTHER PUBLICATIONS

Office action dated Sep. 15, 2009 in corresponding Japanese Application No. 2007-097794.

* cited by examiner

BATTERY UNIT WITH COOLING DEVICE

CROSS REFERENCE TO RELATED APPLICATION

This application is based on Japanese Patent Application No. 2007-97794 filed on Apr. 3, 2007, the disclosure of which is incorporated herein by reference.

FIELD OF THE INVENTION

The present invention relates to a battery unit with a cooling device for cooling a battery, which is, for example, used as a driving power source of a vehicle driving motor.

BACKGROUND OF THE INVENTION

A battery unit with a cooling device is, for example, described in Japanese Unexamined Patent Application Publication No. 2003-346759. The described battery unit includes a battery module assembly as a battery, which is an important part, and a blower as the cooling device for cooling the battery module assembly. The battery module assembly is housed in a battery cover. The blower has a blower casing. The blower casing is connected to the battery cover at a position above the battery module assembly, and a passage of the cooling air is defined therein.

Such a battery unit is, for example, mounted in hybrid vehicles. Thus, silence is required in an eco-running mode in which an engine is stopped. Also, in a case where the battery unit is arranged on a rear side of a luggage room of the hybrid vehicle, it is required to be compact.

In the described battery unit, the battery module assembly is inclined downward toward the blower relative to a flow direction of the cooling air blown from the blower. Because a predetermined passage is defined between an upper inner surface of the battery cover and an upper surface of the battery module assembly, resistance to flow of the cooling air is reduced, and hence noise is reduced. On the other hand, a size of the battery unit including the battery cover and the blower casing increases due to the passage defined by the arrangement of the battery module assembly.

SUMMARY OF THE INVENTION

The present invention is made in view of the foregoing matter, and it is an object of the present invention to provide a battery unit with a cooling device, which is capable of reducing noise and size.

According to an aspect of the present invention, a battery unit includes a module assembly, a battery housing that houses the module assembly, and a blower for generating air for cooling the module assembly. The module assembly includes a plurality of battery modules, and the battery modules are stacked in a first direction. The module assembly defines a first surface and a second surface opposite to the first surface. The blower has a rotation shaft that is located between a first plane that includes the first surface and a second plane that includes the second surface. The blower is disposed at an end of the module assembly to supply air toward the first surface of the module assembly in a direction substantially perpendicular to the first direction, the flow of air being supplied over a range that is substantially equal to a dimension of the module assembly in the first direction.

In the above construction, since the rotation shaft of the blower is disposed between the first plane and the second plane of the module assembly, an entire size of the battery unit in the direction perpendicular to the first and second planes, such as a height, is reduced. Further, the air is supplied toward the first surface of the module assembly over a substantially entire range of the module assembly with respect to the first direction. Therefore, the air is supplied substantially equally to the battery modules with respect to the first direction while reducing a resistance to flow of the air. Accordingly, noise is reduced while reducing the size.

According to a second aspect of the present invention, a battery unit includes a module assembly, a battery housing and a blower for supplying air toward the module assembly. The module assembly includes a plurality of battery modules. The battery modules are staked in a width direction such that side surfaces thereof are opposed to each other, the side surfaces being parallel to a longitudinal direction of the battery modules. The module assembly is housed in the battery housing. The blower is disposed to oppose a first end wall of the battery housing, the first end wall being perpendicular to the side surfaces of the battery modules. The blower includes a rotation shaft that is located between an upper end and a lower end of the module assembly with respect to an up and down direction of the module assembly. The blower is configured to supply the air toward an upper surface of the module assembly, the air being supplied over a range that is substantially equal to a dimension of the module assembly in the width direction.

In the above construction, since the rotation shaft of the blower is disposed between the upper end and the lower end of the module assembly with respect to the up and down direction, an entire size of the battery unit in the up and down direction is reduced. Further, the air is supplied toward the upper surface of the module assembly over a substantially entire range of the module assembly with respect to the width direction. Therefore, the air is supplied substantially equally to the battery modules with respect to the width direction while reducing a resistance to flow of the air. Accordingly, noise is reduced while reducing the size.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

First Embodiment

A first embodiment of the present invention will now be described with reference to FIGS. 1 to 4. A battery unit of the present embodiment is, for example, used in a hybrid vehicle that is driven by an internal combustion engine and a battery-driven motor. The battery unit includes a battery as a driving source of a driving motor and a cooling device for cooling the battery. The battery is, for example, a nickel-metal hydride secondary battery, a lithium-ion secondary battery, an organic radical battery or the like. In the vehicle, the battery unit is mounted in a predetermined place, such as under a seat of the vehicle, in a space defined between a rear seat and a luggage room, in a space defined between a driver's seat and a front passenger's seat, or the like.

Referring to FIGS. 1 to 4, the battery unit generally includes a module assembly 1 as the battery and a blower 30 for generating air for cooling the module assembly 1. The module assembly 1 and the blower 30 are integrated into a battery package and mounted in the predetermined place in the vehicle. In the drawings, arrows denote general flow directions of the air generated by the blower 30. The battery unit is, for example, mounted in a direction, as shown by an up and down direction of FIG. 2. However, the arrangement direction of the battery unit is not limited to the illustrated direction.

The module assembly 1 is constructed of an assembly of battery modules (e.g., fifth battery modules). The battery modules are electrically connected in series, and housed in a battery housing 2. Further, in the battery housing 2, the battery modules are arranged such that side surfaces of the battery modules are opposed to each other, the side surfaces being substantially parallel to longitudinal directions of the battery modules. The battery modules are arranged such that the side surfaces thereof are substantially parallel to a flow direction of the air blown from the blower 30. In other words, the battery modules are stacked in a width direction (e.g., first direction) of the module assembly 1, which is perpendicular to the flow direction (e.g., second direction) of the air blown from the blower 30. The width direction corresponds to a right and left direction in FIG. 1. Hereinafter, the width direction is also referred to as a stacking direction of the battery modules.

Figure 1:
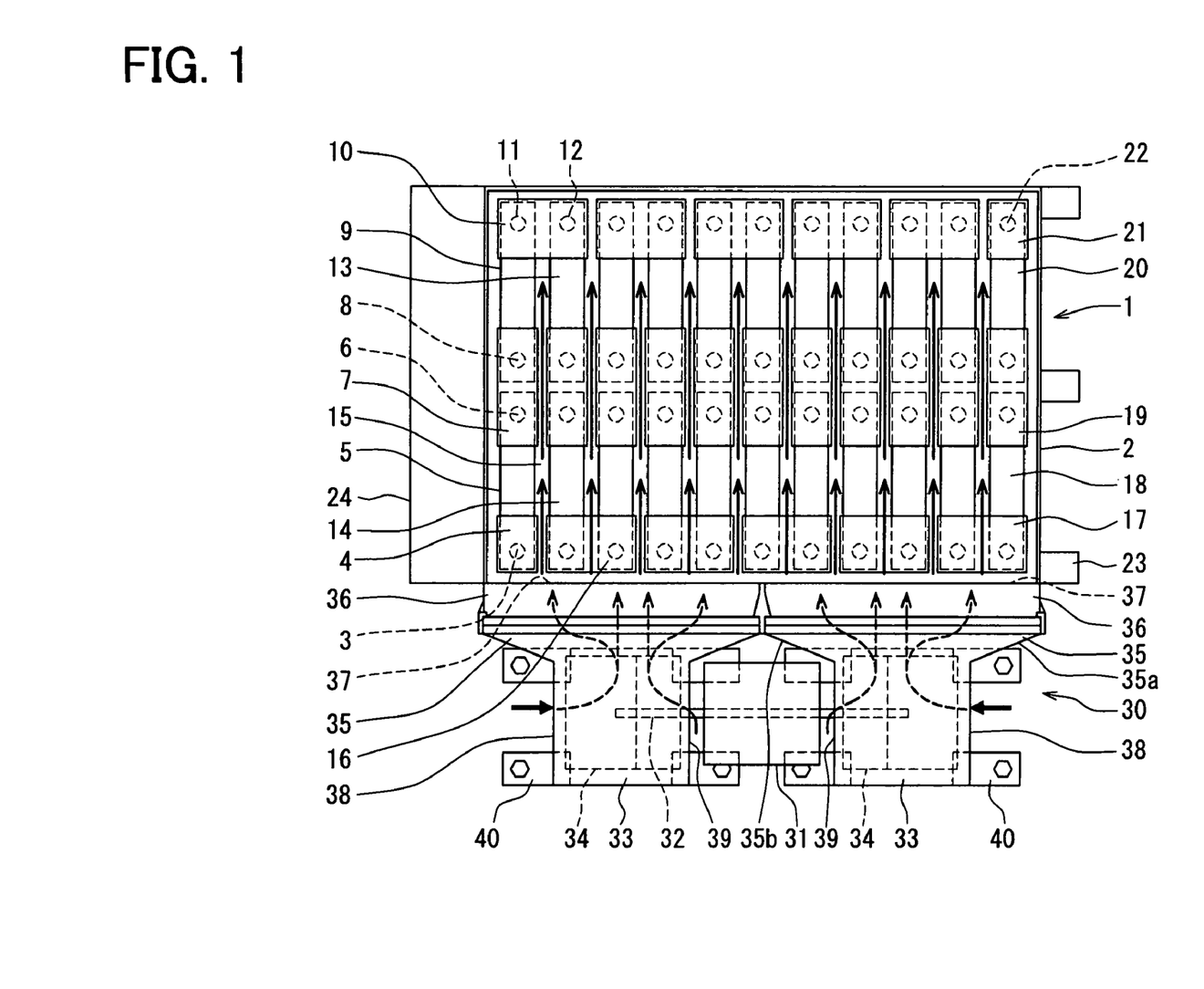
FIG. 1 is a schematic top view of a battery unit according to a first embodiment of the present invention.

The battery housing 2 has a generally rectangular parallel-epiped box shape, and at least one side wall of the battery housing 2 is detachable, such as for a purpose of maintenance. The battery housing 2 is made of resin, steel sheet, or the like. The battery housing 2 includes a device box 24 and fixing portions 23 on its sides. The battery housing 2 is fixed to a part of the vehicle by fastening fixing parts such as bolts through the fixing portions 23. The device box 24 houses a battery monitoring unit including sensors for monitoring conditions of the module assembly 1, a control unit for controlling a motor 31 of the blower 30 and the module assembly 1, wire harnesses for wiring various devices, and the like.

Each of the battery modules is covered with a resinous outer case for an electrical insulation. The battery module has a generally flat rectangular parallelepiped shape. The battery module has a positive electrode and a negative electrode at ends. The positive electrode and the negative electrode are separated from each other in the longitudinal direction (e.g., an up and down direction in FIG. 1) of the battery module. The positive electrode and the negative electrode are exposed from the outer case.

In the battery housing 2, the module assembly 1 is disposed such that a first space 2a (e.g., upper space) is defined between an inner surface of the battery housing 2 and a first surface of the module assembly 1. For example, the first space 2a is defined between an upper inner surface of the battery housing 2 and an upper surface of the module assembly 1. Also, the module assembly 1 is disposed such that a second surface thereof (e.g., bottom surface) is separated from an inner bottom surface of the battery housing 2 for defining a second space. In this case, a dimension of the second space is sufficiently smaller than a dimension of the first space 2a, with respect to the up and down direction in FIG. 2. Alternatively, the module assembly 1 can be disposed such that the bottom side is in contact with the inner bottom surface of the battery housing 2.

The dimension of the first space 2a is relatively large in the up and down direction in FIG. 1 for housing the terminals and electrode members of the battery modules and for providing an air passage for cooling the terminals and the electrode members.

The battery modules are arranged in two rows, such as an upstream row and a downstream row, with respect to the flow direction of the air (e.g., the up and down direction in FIG. 1). The battery modules of the upstream row are spaced from the battery modules of the downstream row by a predetermined distance. In each of the upstream row and the downstream row, the battery modules are stacked in the width direction with predetermined clearances 15 between them. Further, the battery modules are arranged substantially over the width of the battery housing 2.

The battery modules are electrically connected through electrode portions as the conductive members. Further, all the battery modules are electrically connected in series from a positive terminal 3 of a battery module 5 that is located at an end of the upstream row (e.g., left end in FIG. 1) to a negative terminal 22 of a battery module 20 that is located at an opposite end of the downstream row (e.g., right end in FIG. 1) in a meandering manner.

The battery module 5 has the positive terminal 3 on its upstream side with respect to the flow of the air. The positive terminal 3 is electrically connected to an electrode portion 4. The electrode portion 4 serves as a positive electrode portion of the module assembly 1. The battery module 20 has the negative terminal 22 on its downstream side with respect to the flow of the air. The negative terminal 22 serves as a negative electrode portion of the module assembly 1.

The battery module 5 has the negative terminal 6 on its downstream side with respect to the flow of the air. The negative terminal 6 is electrically connected to a positive terminal 8 of another battery module 9 that is located downstream of the battery module 5 through an electrode portion 7.

A battery module 13 that is located on a right side of the battery module 9 has a positive terminal 12 on its downstream end and a negative terminal on its upstream end. A negative terminal 11 of the battery module 9 is electrically connected to the positive terminal 12 of the battery module 13 through an electrode portion 10.

A negative terminal of the battery module 13 is electrically connected to a positive terminal of another battery module 14 that is located upstream of the battery module 13 through an electrode portion. Further, a negative terminal of the battery module 14 is electrically connected to a positive terminal of another battery terminal that is located on a right side of the battery module 14 through an electrode portion 16. Likewise, the positive terminals and the negative terminals of the other battery modules are electrically connected through the electrode portions between them in series up to the battery module 20.

The negative terminal 22 of the battery module 20 is electrically connected to a positive terminal of a battery terminal 18 that is located upstream of the battery module 20 through an electrode portion 19. Further, the negative terminal 22 of the battery module 20 is electrically connected to an electrode portion 17 through the battery terminal 18. Namely, all the battery modules in the battery housing 2 are electrically connected in series from the electrode portion 4 of the battery module 5 to the electrode portion 21 of the battery module 20 through the electrode portions such that an electric current passes in a zigzag or meandering manner.

The blower 30 is integrated with the battery housing 2. For example, the blower 30 is located to face an end wall 2b of the battery housing, the end wall 2b being other than upper and lower walls of the battery housing 2 and being perpendicular to side walls that are parallel to the longitudinal directions of the battery modules. The blower 30 generally includes two fans 34, one motor 31 for driving the fans 34, and two casings 33. The fans 34 are correspondingly housed in the casings 33.

The fans 34 are centrifugal fans having resistance to high static pressure and generating low noise with low-air volume. In the present embodiment, the fans 34 are sirocco fans having forward blades, for example. Alternatively, the fans 34 can be radial fans having radial blades.

Figure 2:
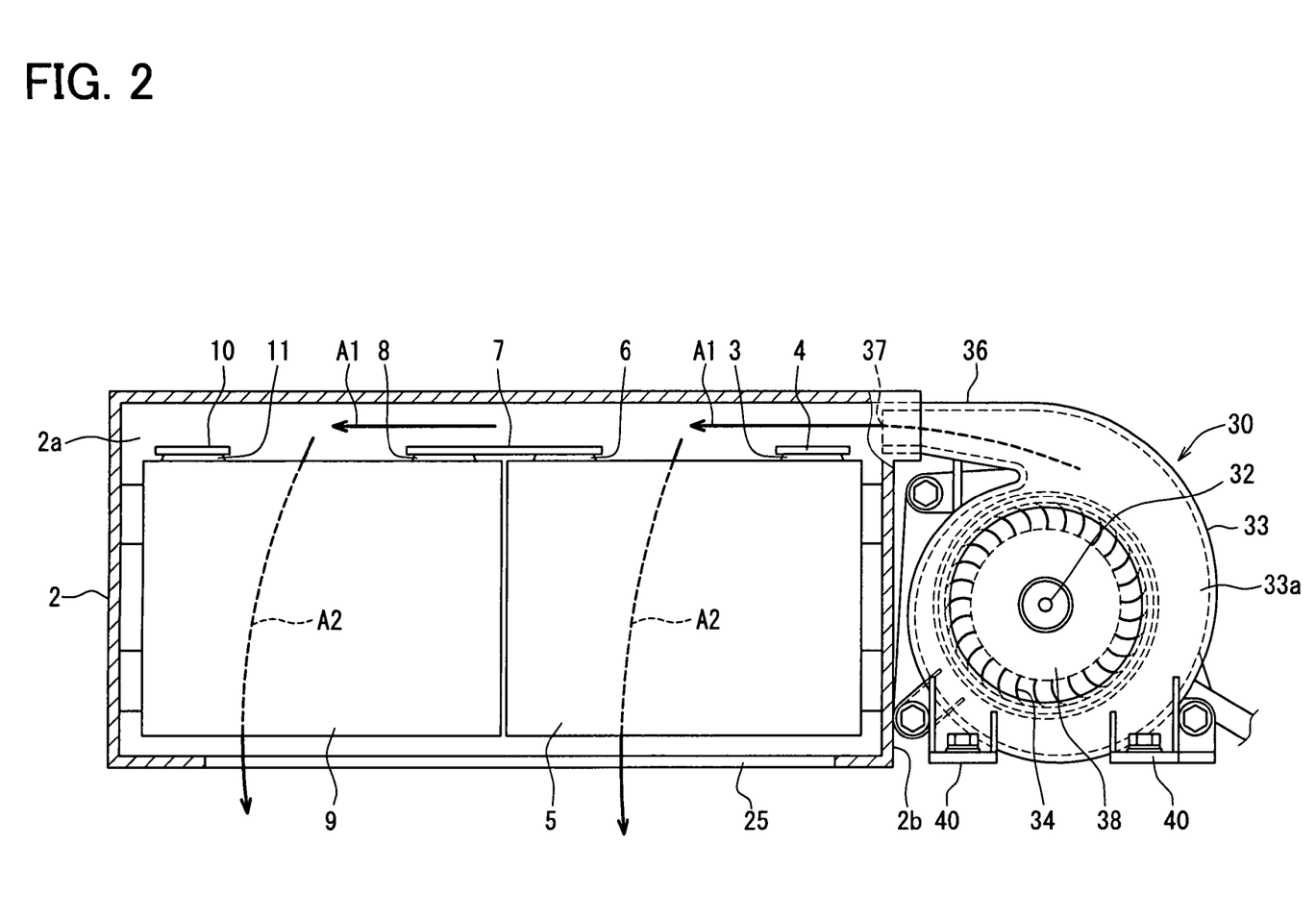
FIG. 2 is a schematic side view of the battery unit, partly including a cross-section, according to the first embodiment.

The motor 31 is arranged such that a rotation shaft 32 extends in a substantially horizontal direction. For example, the rotation shaft 32 is substantially parallel to the width direction of the module assembly 1. The fans 34 are fixed to opposite ends of the rotation shaft 32. As shown in FIG. 2, the rotation shaft 32 is arranged such that its axis is on the height between an upper end of the module assembly 1 and a lower end of the module assembly 1. That is, the position of the rotation shaft 32 is higher than the lower end of the module assembly 1 and lower than the upper end of the module assembly 1, with respect to the up and down direction of FIG. 2. In other words, the rotation shaft 32 is located between a first plane (i.e., first imaginary plane) that includes the first surface of the module assembly 1 and a second plane (i.e., second imaginary plane) that includes the second surface of the module assembly 1.

For example, a diameter of each fan 34 is equal to or smaller than a dimension (height) of the module assembly 1 in the up and down direction of FIG. 2. Further, the fan 34 is arranged such that an upper end and a lower end of the fan 34 are located between the upper end and the lower end of the module assembly 1 with respect to the up and down direction of FIG. 2. Moreover, the casing 33 is arranged such that an upper end and a lower end of the casing 33 are located between an upper end and a lower end of the battery housing 2 with respect to the up and down direction of FIG. 2.

Further, the casing 33 is arranged such that the lower end is located higher than the lower end of the battery housing 2. In this case, the device box 24 can be arranged in a space defined under the lower end of the casing 33. Thus, the size of the battery unit including the device box 24 is reduced.

The motor 31 is controlled by the control unit. For example, the control unit conducts a RWM control in which a voltage is modulated by varying a duty ratio of pulse waves. By the RWM control of the control unit, a rotational speed of the fan 34 is controlled variable in accordance with a target cooling capacity. Accordingly, a surface temperature of the module assembly 1, which is for example detected by a temperature sensor and the like, is controlled.

Each of the casings 33 has a scroll shape and the fan 34 is housed in the casing 33. The casing 33 has suction openings 38, 39 on both sides facing in an axial direction of the rotation shaft 32 for suctioning air. That is, the suction openings 38, 39 open in the axial direction. The casing 33 forms an air passage 33a between its inner surface and the blades of the fan 34, and a passage area (e.g., cross-sectional area) of the air passage 33a gradually increases toward a downstream position with respect to a flow of air generated by the fan 34. The casing 33 is integrally formed with fixing leg portions. The fixing leg portions are fixed to portions of the vehicle through fixing devices such as bolts.

The casing 33 includes an expanding portion 37 that expands toward a downstream position and a tubular portion 36 that extends from the expanding portion 37. The expanding portion 37 and the tubular portion 36 are located above the fan 34. The tubular portion 36 forms an outlet port 37 at a downstream end thereof. The tubular portion 36 is connected to a connecting port of the battery housing 2 such that the outlet port 37 is in communication with the first passage defined in the battery housing 2 for blowing the air generated by the fan 34 toward the upper surface of the module assembly 1.

Namely, the casing 33 forms the air passage 33a from a radially outside position of the fan 34 toward the outlet port 37. On a position directly facing the fan 34 in a radial direction, a dimension (e.g., cross-sectional area) of the air passage 33a gradually increases in the radial direction toward the downstream position. The expanding portion 35 is configured such that the dimension of the air passage 33a therein increases in the axial direction (e.g., right and left direction in FIG. 1) toward the outlet port 37.

The expanding portion 35 is generally flat shape. Although the width of the expanding portion 35 in the axial direction increases toward the outlet port 37, the dimension of the expanding portion 35 in the radial direction, such as in a direction perpendicular to the axial direction, gradually reduces toward the outlet port 37. Further, the expanding portion 35 is formed such that the cross-sectional area of the air passage 33a gradually increases toward the outlet port 37. The outlet port 37 has a shape corresponding to the shape of the first space 2a in the battery housing 2, and the cross-sectional shape of the expanding portion 35 gradually varies toward the outlet port 37.

Since the casings 33 have the expanding portions 35 that provide the air passages 33a expanding in the axial direction toward the outlet ports 37, the air generated by the fans 34 is introduced to the outlet ports 37 with the width substantially equal to the width of the battery housing 2. Further, due to the above shape of the casings 33, the dimension of the casings 33 in the air flow direction, that is, in the up and down direction in FIG. 1 is reduced.

In the example shown in FIG. 1, each casing 33 has a symmetric shape with respect to an axis of the air passage 33a that is generally perpendicular to the axial direction. In other words, inner and outer side walls 35a, 35b of the expanding portion 35 are expanded outwardly substantially equally to each other. However, it is not always necessary that the casing 33 has the symmetric shape with respect to the axis of the air passage 33a. For example, the casing 33 can have the shape shown in FIGS. 3 and 4.

Figure 3:
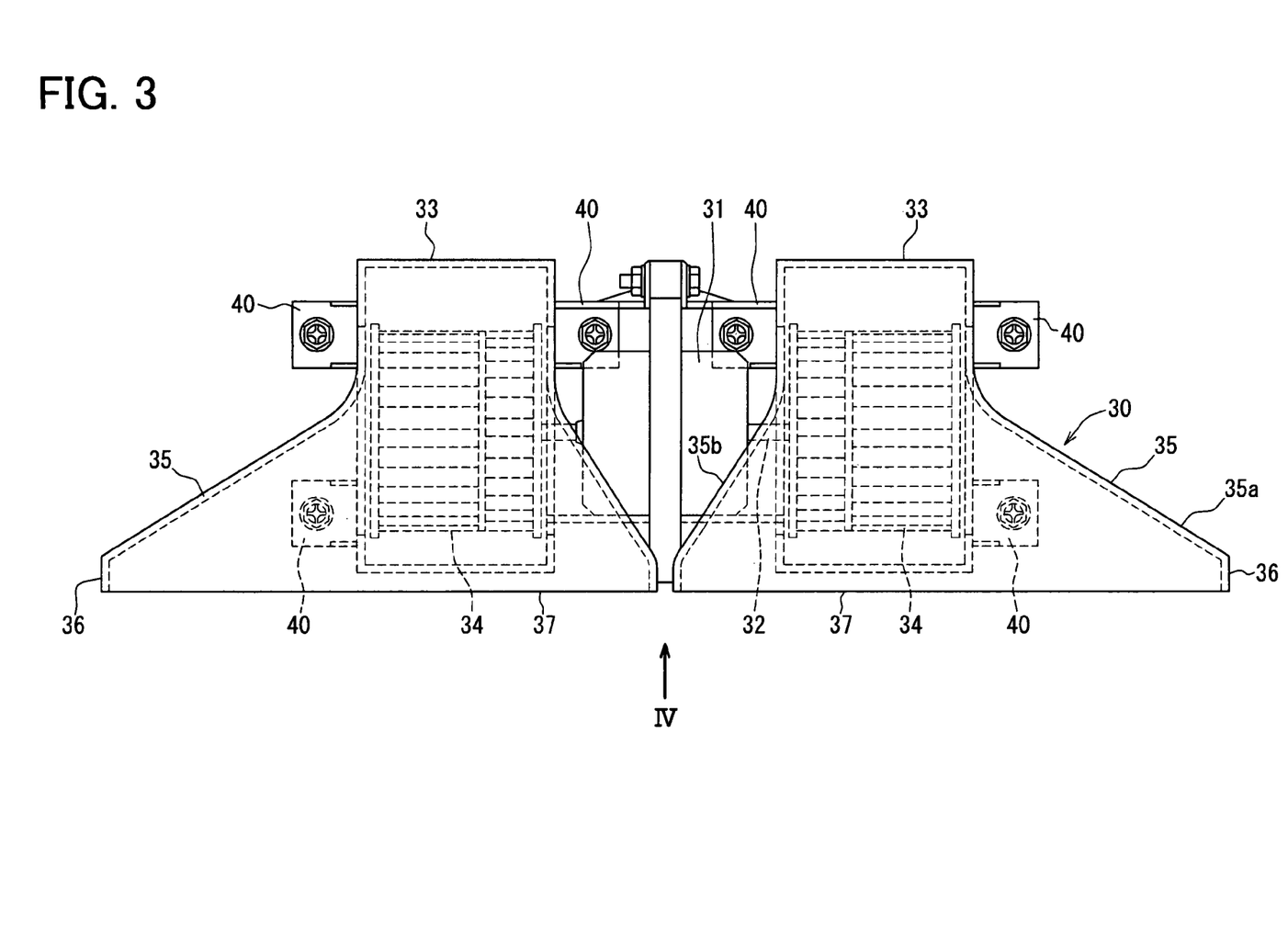
FIG. 3 is a top view of a blower of the battery unit according to the first embodiment.
Figure 4:
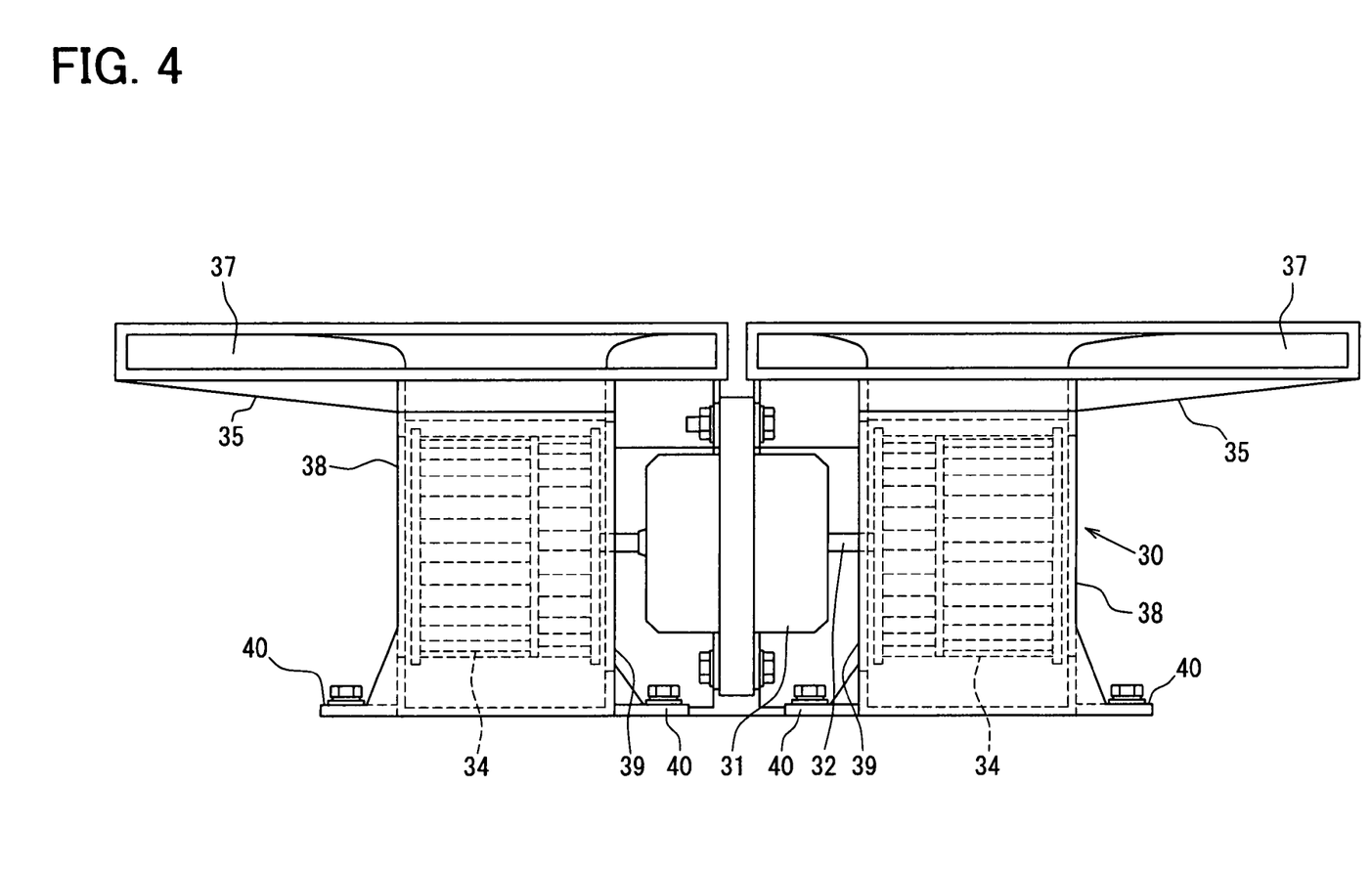
FIG. 4 is a front view of the blower, when viewed along an arrow IV in FIG. 3, according to the first embodiment.

In the example shown in FIGS. 3 and 4, the casings 33 that are located on opposite sides of the motor 31 have the symmetric shape with each other. However, in each of the casing 33, the expanding portions 35 are asymmetric with each other with respect to the axis of the air passage 33a. The expanding portion 35 of each casing 33 is formed to expand more to the outside than to the center. That is, the expanding portion 35 of each casing 33 is formed such that its outer side wall 35a expands more than its inner side wall 35b.

The outlet port 37 has a flat shape such that the dimension with respect to the up and down direction in FIGS. 1 and 4 is smaller than the dimension with respect to the width direction. Further, the total dimension of the two outlet ports 37 with respect to the width direction is substantially equal to the width of the module assembly 1. That is, the total dimension of the two outlet ports 37 with respect to the width direction is substantially equal to the total dimension of the stacked battery modules including the clearances 15 with respect to the width direction.

The outlet ports 37 are located above the fans 34. Also, the outlet ports 37 are open at the position that is closer to the module assembly 1 than the fans 34. Each casing 33 includes the expanding portion 35 that defines the air passage 33a expanding in the axial direction of the fan 34 above the fan 34 and extending toward the module assembly 1. The expanding portion 35 connects to the outlet port 37 through the tubular portion 36.

Because of the above configuration of the casing 33, the air is blown from the outlet ports 37 toward the upper surface of the module assembly 1 with high static pressure having relatively high speed, although the volume is low. Namely, the above structure of the expanding portions 35 and the outlet ports 37 provide the air flow while reducing noise even in a narrow passage defined in the casing 33 and the battery housing 2.

The outlet ports 37 are located to open to the upper portion of the battery housing 2 and have the width substantially over the width of the module assembly 1. Thus, the air is introduced substantially entirely over the upper portion of the battery housing 2.

The air is blown over the upper surface of the module assembly 1. The air reaches the upper surfaces of the battery modules in the upstream row and the upper surfaces of the battery modules in the downstream row, as shown by arrows A1. As such, the upper portions of the module assembly 1 are cooled.

Further, the air enters the clearances 15 defined between the stacked battery modules and flows toward the lower portion of the battery housing 2 while cooling the battery modules, as shown by arrows A2. The battery housing 2 is formed with a discharge opening 25 at the lower portion. Thus, the air is discharged to the outside of the battery housing 2 from the discharge opening 25.

In the battery unit of the present embodiment, the rotation shaft 32 of the blower 30 is located perpendicular to the longitudinal directions of the battery modules, that is, parallel to the stacking direction of the battery modules. The rotation shaft 32 is located between the upper end and the lower end of the module assembly 1 with respect to the up and down direction that is perpendicular to the stacking direction of the battery modules and the axial direction of the rotation shaft 32. The expanding portions 35 and the outlet ports 37 are configured such that the air is blown toward the upper portion of the module assembly 1 while expanding substantially entirely over the width direction of the module assembly 1.

Since the rotation shaft 32 is located between the upper end and the lower end of the module assembly 1, the overall height of the battery unit in the up and down direction of FIG. 2 is reduced. Since the air is blown toward the upper surface of the module assembly 1 and substantially entirely over the width of the module assembly 1, cooling efficiency improves and noise is reduced even with a relatively low air volume. Further, the height of the battery housing 2 in the up and down direction is substantially two-thirds of the length of the battery housing 2 in the air flow direction, that is, in the right and left direction in FIG. 2.

The casing 33 has the suction openings 38, 39 for suctioning air into the casing 33 with the rotation of the fan 34, and outlet port 37 for blowing the air toward the upper surface of the module assembly 1. The air passage 33a defined in the casing 33 has a shape that expands toward the outlet port 37. The outlet port 37 is directly in communication with the first space 2a defined in the upper portion within the battery housing 2. The outlet port 37 has the substantially flat shape in which the width is greater than the height.

In this construction, the air is supplied toward the module assembly 1 with uniform distribution of flow speed by the air passage 33a that expands toward the outlet port 37. Since the centrifugal fan such as the sirocco fan 34 is employed, the air flow with reduced volume and high static pressure is provided. Therefore, even when the air is blown into the first space 2a, which has relative high resistance to flow of the air due to the size reduction of the apparatus, noise is reduced while saving power. Further, since the outlet port 37 has the flat shape, the air flow with high flow speed is provided even with the reduced volume. Therefore, a required cooling capacity is maintained while reducing the noise.

In the module assembly 1, the battery modules are stacked while maintaining the clearances 15 between the side surfaces thereof, the side surfaces being parallel to the longitudinal directions of the battery modules. Further, the blower 30 and the module assembly 1 are arranged such that the side surfaces of the battery modules are parallel to the air flow direction from the outlet port 37. Thus, the air blown from the outlet port 37 effectively flows through the clearances 15. As such, the air flows along the outer surfaces of the battery modules, and hence the cooling efficiency improves.

Second Embodiment

A second embodiment of the present invention will now be described with reference to FIGS. 5 and 6. The battery unit of the second embodiment has the similar structure as the battery unit of the first embodiment, but the module assembly 1 additionally includes cooling fins above the electrode portions. Hereinafter, like components are denoted by like reference characters and a description thereof is not repeated. The like components provide the similar effects as those of the first embodiment.

Figure 5:
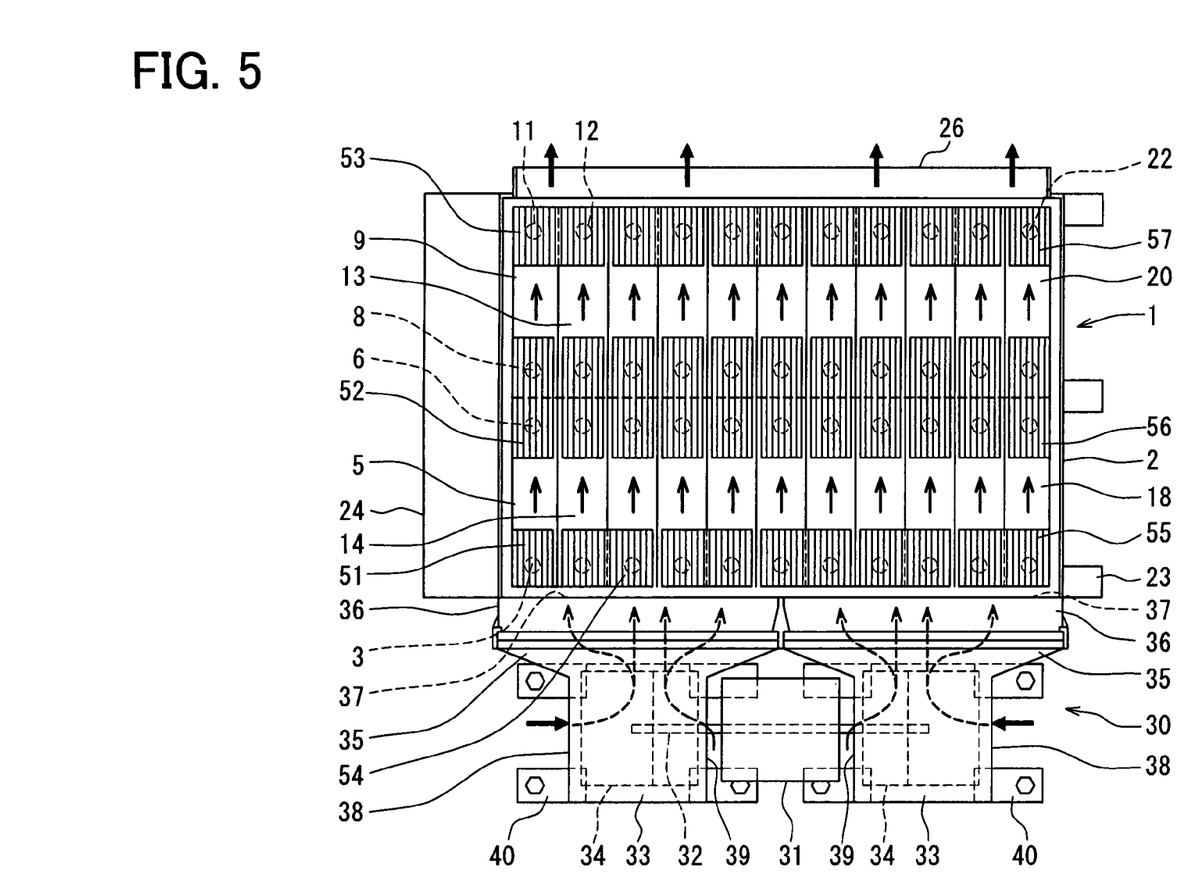
FIG. 5 is a schematic top view of a battery unit according to a second embodiment of the present invention.

As shown in FIG. 5, the cooling fins are disposed on the electrode portions. For example, a cooling fin 51 is disposed on the positive terminal of the battery module 5. A cooling fin 57 is disposed on the negative terminal of the battery module 20. The opposite terminals, such as the negative terminals and the positive terminals, between the battery module 5 and the battery module 9, are electrically connected through the electrode portions. All the electrode portions are provided with cooling fins (e.g., cooling fins 52, 53, 54, 55, 56) to which heat of the electrode portions are transferred. The battery modules are stacked while maintaining the clearances 15, similar to those of the first embodiment. Alternatively, the battery modules can be stacked without clearances, such that the side walls of the adjacent battery modules are in contact with each other.

The cooling fins are, for example, made of aluminum alloy or the like. The cooling fins have corrugated shape, and are disposed such that projections and recesses are alternately arranged in the width direction of the module assembly 1, that is, in the right and left direction of FIG. 5. That is, walls forming the projections and the recesses, that is wall of the folds are disposed to extend in the air flow direction, that is, in the direction perpendicular to the width direction of the module assembly 1. The walls have louvers, which are for example formed by cutting such as pressing.

The cooling fins are insulated from the electrode portions. Alternatively, the cooling fins are electrically conductive to the electrode portions. In the case where the cooling fins are electrically conductive to the electrode portions, the cooling fins that are adjacent in the width direction of the module assembly 1 are insulated from each other to avoid short circuit. For example, the cooling fin 51 and the cooling fin 54 are insulated from each other. In the case of insulating the cooling fins from the electrode portions, insulation members having thermal conductivity are disposed between the electrode portions and the cooling fins.

The blower 30 is disposed to supply the air toward the cooling fins. The outlet ports 37 are open to the first space 2a of the battery housing 2 and located at the substantially same height of the cooling fins. In the present embodiment, the battery housing 2 has a discharge opening 26 for discharging the air that has passed through the cooling fins. The discharge opening 26 is formed on an end wall 2c that is opposed to the end wall 2b to which the tubular portions 36 of the casing 33 is connected. The discharge opening 26 is, for example, located on the substantially same height of the cooling fins.

The air generated by the fans 34 is blown into the battery housing 2 from the outlet ports 37 after passing through the air passage 33a of the casings 33, which expand toward the downstream positions. The outlet ports 37 are located on the substantially same height of the first space 2a of the battery housing 2. Also, the width of the outlet ports 37 corresponds to the substantially entire width of the module assembly 1 with respect to the width direction. Thus, the air is blown toward the entirely over the upper surface of the module assembly 1.

Figure 6:
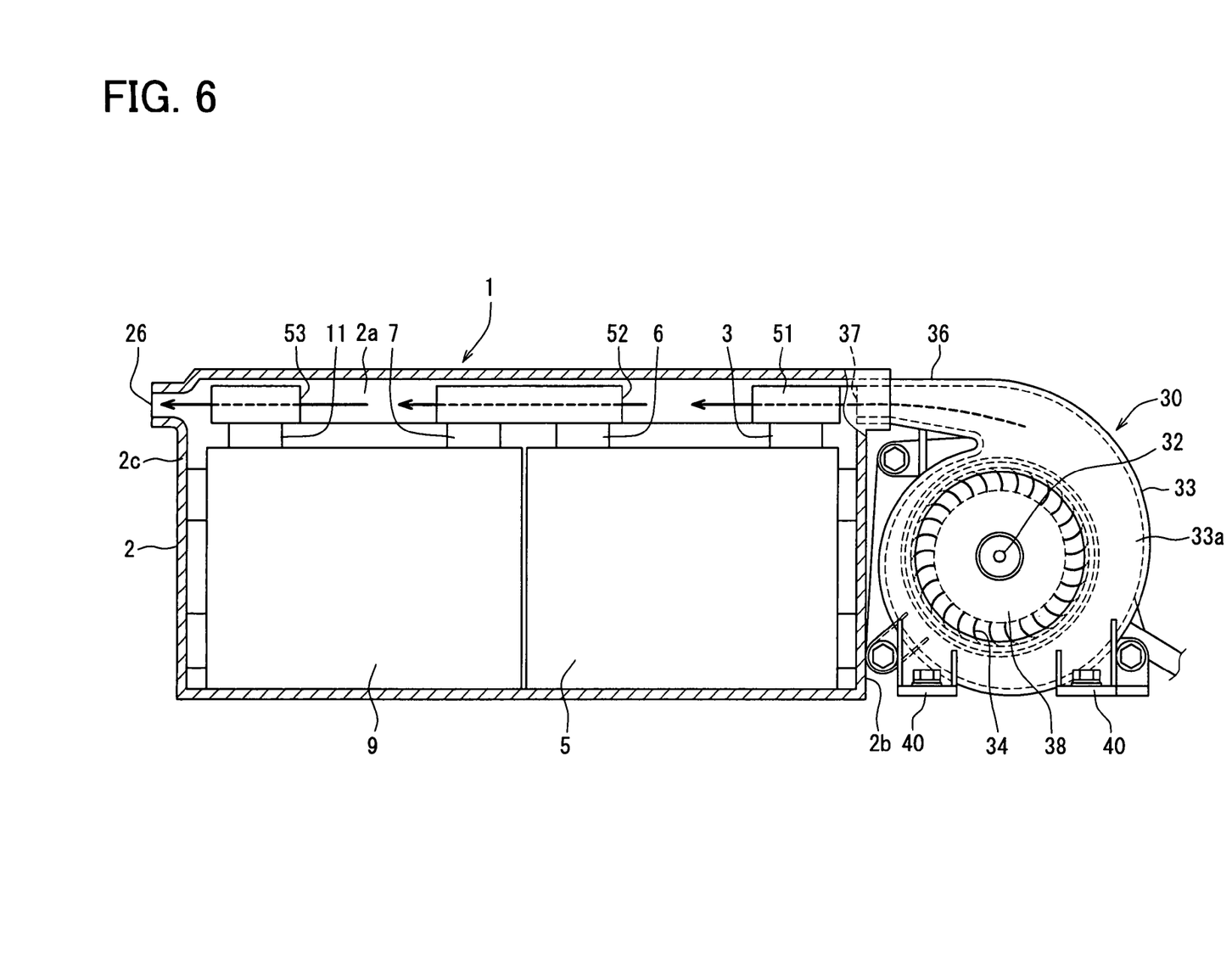
FIG. 6 is a schematic side view of the battery unit according to the second embodiment.

In the battery housing 2, the air flows through the cooling fins in an upstream row (e.g., cooling fins 51, 55), the cooling fins in a midstream row (e.g., cooling fins 52, 56) and the cooling fins in a downstream row (e.g., cooling fins 53, 57), as shown by arrows A3 in FIG. 6. While passing through the cooling fins, the air receives heat from the surfaces of the cooling fins. Thus, the module assembly 1 is cooled. Further, the air is discharged to the outside of the battery housing 2 from the discharge opening 26.

In the battery unit of the present embodiment, noise level is measured, and is compared with that of a battery unit of a comparative example. In the battery unit of the comparative example, a blower is connected to a battery module through a duct.

In a case where the volume of air is 75 m³/h, the noise level of the present embodiment is 36 dBA. On the other hand, the noise level of the comparative example is 50 dBA. Further, in a case where the air volume is measured in the same noise level condition, the air volume of the present embodiment is one and a half times of that of the comparative example.

Here, the noise level L is calculated based on the following equation:

$$L = Ks + 10 \operatorname{Log}(Va \times \Delta Pa^2)$$

in which Ks represents specific sound level, that is, a sound level of the blower; Va represents the volume of air; and ΔPa represents resistance to flow of air. In the battery unit of the present embodiment, since the resistance to flow of air ΔPa is reduced, the noise level is lowered. Also in the battery unit of the first embodiment, the similar effect is provided.

In the present embodiment, the cooling fins are provided on the upper surface of the module assembly 1, and the air is supplied from the blower 30 toward the cooling fins for cooling the cooling fins. In this construction, a heat radiating area for radiating heat generated from the module assembly 1 is increased by the cooling fins. Therefore, heat radiation efficiency improves. Further, unevenness of temperature between the battery modules is reduced. Thus, the battery unit provides a stable battery effect.

In this case, the clearances 15 between the battery modules are not always necessary. When the battery modules are stacked without clearances 15, the size of the module assembly 1 is reduced. Also, parts for providing the clearances 15 are not required. As such, the number of assembling steps and the number of component parts are reduced.

The outlet ports 37 are open toward the first space 2a of the battery housing 2 and located at the substantially same height of the cooling fins. In this case, the volume of air for cooling the cooling fins is increased, and hence cooling efficiency improves. Further, since the air flows through the cooling fins from the outlet ports 37 in a substantially straight manner, the resistance to flow of the air is reduced.

In addition, the discharge opening 26 is formed on the end wall 2c of the battery housing 2, the end wall 2c being opposed to the outlet ports 37 in the longitudinal directions of the battery modules. Since the air flows from the outlet ports 37 to the discharge opening 26 through the cooling fins in the substantially straight manner, the resistance to flow of the air is reduced. Moreover, the discharge opening 26, the outlet ports 37 and the cooling fins are located on the substantially same height. Therefore, the resistance to flow of the air is further reduced, and the noise is further reduced.

Third Embodiment

Figure 7:
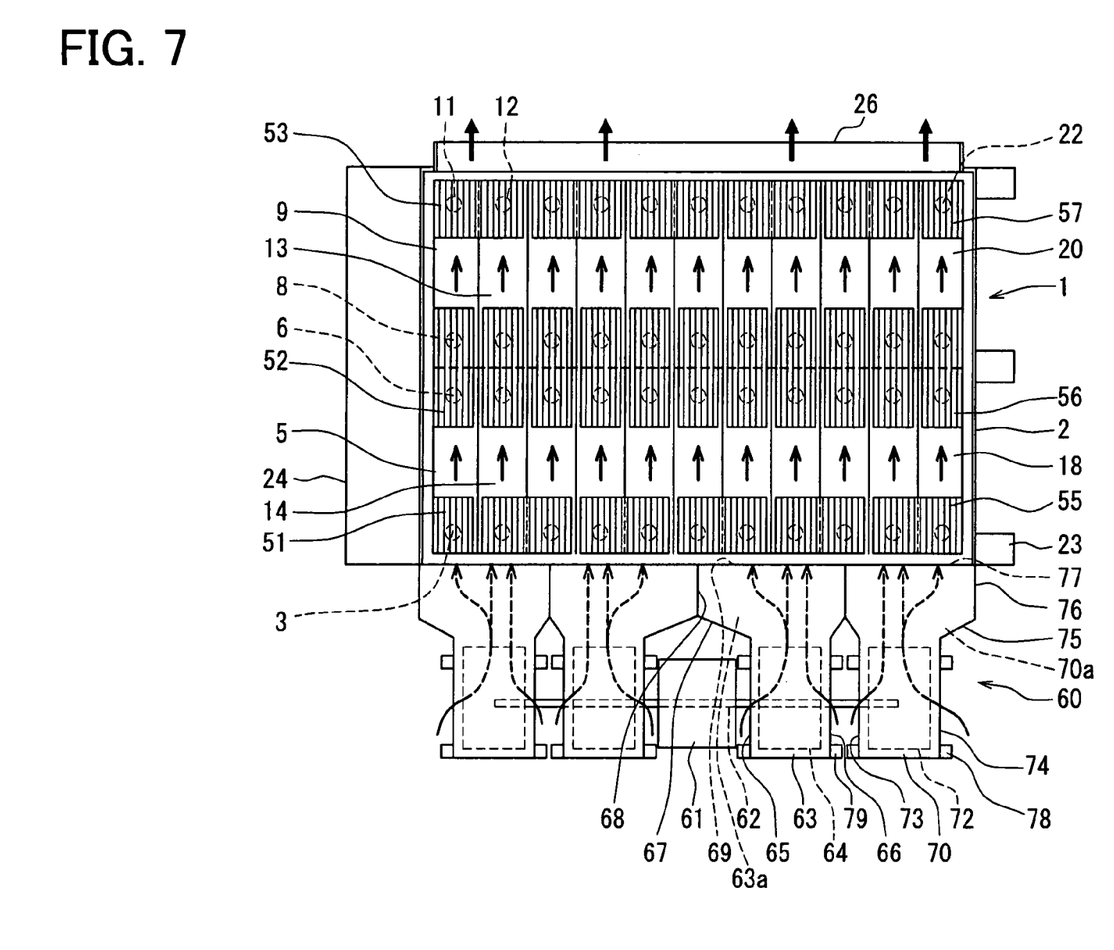
FIG. 7 is a schematic top view of a battery unit according to a third embodiment of the present invention.

A third embodiment of the present invention will now be described with reference to FIG. 7. The battery unit of the third embodiment includes the module assembly 1 of the second embodiment and a blower 60, in place of the blower 30 of the first and second embodiments. Hereinafter, like components are denoted by like reference characters and a description thereof is not repeated. The like components provide the similar effects as those of the first embodiment.

The blower 60 is integrated with the end wall 2b of the battery housing 2. The blower 60 includes two fans 64, two fans 72, a motor 61 for driving the four fans 64, 72, two casing 63 for housing the fans 64 and two casings 70 for housing the fans 72. Similar to the first embodiment, the fans 64, 72 are centrifugal fans, such as sirocco fans or radial fans.

The motor 61 has a rotation shaft 62 that extends in the stacking direction of the battery modules, such as in the substantially horizontal direction. The fans 64 are fixed to the rotation shaft 62 on opposite sides of the motor 61. The fans 72 are fixed to the rotation shaft 62 on further opposite sides of the fans 64. In other words, the fans 64 are located closer to the motor 61 than the fans 72.

Similar to the rotation shaft 32 of the first embodiment, the rotation shaft 62 is disposed between the upper end and the lower end of the module assembly 1 with respect to the up and down direction.

For example, the diameter of the fans 64, 72 are substantially equal to or smaller than the height of the module assembly 1. The fans 64, 72 are arranged such that the upper ends thereof are located lower than the upper end of the module assembly 1 and the lower ends thereof are located higher than the lower end of the module assembly 1. Also, the casings 63, 70 are arranged such that the upper ends thereof are located lower than the upper end of the battery housing 2 and the lower ends thereof are located higher than the lower end of the battery housing 2. For example, the lower ends of the casings 63, 70 are located higher than the lower end of the battery housing 2, so that the device box 24 can be arranged in a space defined under the casings 63, 70. Thus, the size of the battery unit including the device box 24 is reduced.

The motor 61 is controlled by the control unit, in the similar manner as the motor 31. Each of the casings 63 houses the fan 64. The casing 63 has suction openings 65, 66 on opposite sides thereof with respect to the axial direction for suctioning air into the casing 63. Likewise, each of the casing 70 houses the fan 72. The casing 70 has suction openings 73, 74 on opposite sides thereof with respect to the axial direction for suctioning air into the casing 70. The casings 63, 70 have the scroll shape. The casings 63, 70 are formed with fixing leg portions 40. The fixing leg portions 40 are fixed to the portions of the vehicle through the fixing parts such as bolts.

The casing 63 has an outlet port 69 for blowing air toward the upper surface of the module assembly 1. The casing 63 forms an air passage 63a between its inner surface and the radially outside of the fan 64, and the air passage 63a is in communication with the outlet port 69. Further, the casing 63 has an expanding portion 67 and a tubular portion 68 extending from the expanding portion 67. The expanding portion 67 is located above the fan 64. The dimension of the expanding portion 67 in the axial direction increases toward the downstream position, similar to the expanding portion 35 of the first embodiment. The tubular portion 68 forms the outlet port 69 at its downstream end. The tubular portion 68 extends from the expanding portion 67 to the battery housing 2 parallel to the longitudinal direction of the battery modules. The tubular portion 68 is fitted in the connecting port of the end wall 2b of the battery housing 2 such that the outlet port 69 is in communication with the first space 2a of the battery housing.

Likewise, the casing 70 has an outlet port 77 for blowing air toward the upper surface of the module assembly 1. The casing 70 forms an air passage 70a between its inner surface and the radially outside of the fan 72, and the air passage 70a is in communication with the outlet port 77. Further, the casing 70 has an expanding portion 75 and a tubular portion 76 extending from the expanding portion 75. The expanding portion 75 is located above the fan 72. The dimension of the expanding portion 75 in the axial direction increases toward the downstream position, similar to the expanding portion 35 of the first embodiment. The tubular portion 76 forms the outlet port 77 at its downstream end. The tubular portion 76 extends from the expanding portion 75 to the battery housing 2 parallel to the longitudinal direction of the battery modules. The tubular portion 76 is fitted in the connecting port of the end wall 2b of the battery housing 2 such that the outlet port 77 is in communication with the first space 2a of the battery housing.

The outlet ports 69, 77 have the flat shape in which the dimension in the up and down direction is smaller than the dimension in the width direction, similar to the outlet port 37 of the first embodiment. Four outlet ports 69, 77 are aligned in the axial direction of the rotation shaft 62. The total width of the outlet ports 69, 77 is substantially equal to the width of the module assembly 1. Further, the outlet ports 69, 77 are located higher than the fans 63, 72 and open at positions closer to the module assembly 1 than the fans 63, 72. The outlet ports 69, 77 are open entirely over the width of the first space 2a in the battery housing 2.

Also in this construction, the similar effects as the above embodiments will be provided.

(Modifications)

In the above exemplary embodiments, the battery unit is mounted in the vehicle such that the rotation shaft 32, 62 extend in the substantially horizontal direction. However, the arrangement direction of the battery unit is not limited to the above. The battery unit may be arranged in various directions in accordance with a shape or size of a provided space in the vehicle. For example, the battery unit may be mounted such that the blower 30, 60 and the battery assembly 1 are aligned in the up and down direction. As another example, the battery unit may be mounted such that the rotation shaft 32, 62 of the blower 30, 60 extend in the up and down direction.

In the above embodiments, each casing 33, 63, 70 has suction openings 38, 39, 65, 66, 73, 74 on both sides with respect to the axial direction. Alternatively, each casing 33, 63, 70 can have one suction opening on one of the sides thereof. Further, the number of centrifugal fans 34, 64, 72 are not limited to two or four.

The above embodiments will be combined in various ways. For example, the battery unit may be constructed by combination of the module assembly 1 of the first embodiment and the blower 60 of the third embodiment.

Additional advantages and modifications will readily occur to those skilled in the art. The invention in its broader term is therefore not limited to the specific details, representative apparatus, and illustrative examples shown and described.

What is claimed is:

1. A battery cooling device comprising:
a module assembly including a plurality of battery modules, the battery modules being connected in series and arranged such that side surfaces of the battery modules are opposed to each other, the side surfaces being parallel to a longitudinal direction of the battery modules;
a battery housing that houses the module assembly;
a blower disposed to oppose a wall of the battery housing, the wall being perpendicular to the side surfaces of the battery modules and being other than a top wall and a bottom wall of the battery housing, wherein
the blower has a rotation shaft connecting two fans, the rotation shaft being located at a height between an upper end and a lower end of the module assembly with respect to an up and down direction of the module assembly,
the blower is configured to blow cooling air toward an upper surface of the module assembly, the cooling air being supplied over a range that is substantially equal to a dimension of the module assembly in a transverse direction,
the battery modules are stacked in a direction perpendicular to a flow direction of the cooling air blown from the blower, such that the longitudinal direction of the battery modules coincides with the flow direction of the cooling air and clearances are provided between adjacent side surfaces,
the module assembly further includes positive terminals and negative terminals disposed on upper portions of the plurality of battery modules, and electrode portions electrically connecting between opposite terminals of the battery modules, and
the blower is disposed to blow the cooling air in a direction along the clearances, so that the cooling air is discharged to an outside of the housing after passing through the clearances.

2. The battery cooling device according to claim 1, wherein
the blower includes a centrifugal fan and a blower casing that houses the centrifugal fan,
the blower casing has a suction opening for suctioning air in accordance with rotation of the centrifugal fan, an air passage space for allowing air blown by the centrifugal fan to flow, and an outlet port defined at a downstream end of the air passage space, the air passage space including an expanding portion at which the air passage space increases toward the outlet port,
the outlet port is disposed to open to an upper space defined above the upper surface of the module assembly in the battery housing, and
the outlet port defines an opening that has a greater width in the transverse direction than a height in the up and down direction.

3. The battery cooling device according to claim 1, further comprising:
  a cooling fin disposed on the module assembly to be thermally conductive with the electrode portions, wherein
  the blower is disposed to supply the cooling air toward the cooling fin.

4. The battery cooling device according to claim 3, wherein
  the blower includes a centrifugal fan and a blower casing that houses the centrifugal fan,
  the blower casing has a suction opening for suctioning air in accordance with rotation of the centrifugal fan and an outlet port for blowing the air suctioned from the suction opening toward the upper surface of the module assembly, and
  the outlet port is disposed to open to an upper space defined above the upper surface of the module assembly in the battery housing and is located at a substantially same height as the cooling fin.

5. The battery cooling device according to claim 3, wherein
  the blower includes a centrifugal fan and a blower casing that houses the centrifugal fan,
  the blower casing has a suction opening for suctioning air in accordance with rotation of the centrifugal fan and an outlet port for blowing the air suctioned from the suction opening toward the cooling fin,
  the battery housing has a discharge opening for discharging the air blown from the outlet port after the air absorbs heat from the cooling fin,
  the outlet port is disposed to open to an upper space defined above the upper surface of the module assembly in the battery housing, and
  the discharge opening is disposed in a wall of the housing, the wall being opposed to the outlet port.

6. A battery cooling device comprising:
  a module assembly including a plurality of battery modules, the battery modules being connected in series and arranged such that flat surfaces of the battery modules are opposed to each other, the flat surfaces being parallel to a longitudinal direction of the battery modules;
  a battery housing that houses the module assembly;
  a blower disposed to oppose a wall of the battery housing, the wall being perpendicular to the flat surfaces of the battery modules and being other than a top wall and a bottom wall of the battery housing, wherein
  the blower has a rotation shaft connecting two fans, the rotation shaft being located at a height between an upper end and a lower end of the module assembly with respect to an up and down direction of the module assembly,
  the battery modules are stacked in a direction perpendicular to a flow direction of the cooling air blown from the blower, such that the longitudinal direction of the battery modules coincides with the flow direction of the cooling air and clearances are provided between adjacent flat surfaces,
  the module assembly further includes positive terminals and negative terminals disposed on upper portions of the plurality of battery modules, and electrode portions electrically connecting between opposite terminals of the battery modules, and
  the blower is configured to blow the cooling air toward an upper surface of the module assembly and in a direction along the clearances, so that the air is discharged to an outside of the housing after passing through the clearances.

7. The battery cooling device according to claim 6, wherein
  the blower includes a centrifugal fan and a blower casing that houses the centrifugal fan,
  the blower casing has a suction opening for suctioning air in accordance with rotation of the centrifugal fan, an air passage space for allowing air blown by the centrifugal fan to flow, and an outlet port defined at a downstream end of the air passage space, the air passage space including an expanding portion at which the air passage space increases toward the outlet port,
  the outlet port is disposed to open to an upper space defined above the upper surface of the module assembly in the battery housing, and
  the outlet port defines an opening that has a greater width in a transverse direction than a height in the up and down direction.

8. The battery cooling device according to claim 6, further comprising:
  a cooling fin disposed on the module assembly to be thermally conductive with the electrode portions, wherein
  the blower is disposed to supply the cooling air toward the cooling fin.

9. The battery cooling device according to claim 8, wherein
  the blower includes a centrifugal fan and a blower casing that houses the centrifugal fan,
  the blower casing has a suction opening for suctioning air in accordance with rotation of the centrifugal fan and an outlet port for blowing the air suctioned from the suction opening toward the upper surface of the module assembly, and
  the outlet port is disposed to open to an upper space defined above the upper surface of the module assembly in the battery housing and is located at a substantially same height as the cooling fin.

10. The battery cooling device according to claim 8, wherein
  the blower includes a centrifugal fan and a blower casing that houses the centrifugal fan,
  the blower casing has a suction opening for suctioning air in accordance with rotation of the centrifugal fan and an outlet port for blowing the air suctioned from the suction opening toward the cooling fin,
  the battery housing has a discharge opening for discharging the air blown from the outlet port after the air absorbs heat from the cooling fin,
  the outlet port is disposed to open to an upper space defined above the upper surface of the module assembly in the battery housing, and
  the discharge opening is disposed in a wall of the housing, the wall being opposed to the outlet port.

* * * * *